United States Patent
Mitra et al.

(10) Patent No.: US 12,090,444 B2
(45) Date of Patent: Sep. 17, 2024

(54) ONE STEP INTEGRATION OF MEMBRANE DISTILLATION WITH DIRECT AIR-STRIPPING

(71) Applicant: NANOSEPEX INC., Newark, NJ (US)

(72) Inventors: Somenath Mitra, Bridgewater, NJ (US); Cheng Li, Kearny, NJ (US); Sagar Roy, Newark, NJ (US); Kabir Mitra, Fremont, CA (US)

(73) Assignee: NANOSEPEX INC., Newark, NJ (US)

( * ) Notice: Subject to any disclaimer, the term of this patent is extended or adjusted under 35 U.S.C. 154(b) by 235 days.

(21) Appl. No.: 16/861,687

(22) Filed: Apr. 29, 2020

(65) Prior Publication Data

US 2021/0339197 A1    Nov. 4, 2021

(51) Int. Cl.
| | |
|---|---|
| *B01D 61/36* | (2006.01) |
| *B01D 63/02* | (2006.01) |
| *B01D 63/10* | (2006.01) |
| *B01D 71/02* | (2006.01) |
| *B01D 71/26* | (2006.01) |
| *B01D 71/34* | (2006.01) |
| *B01D 71/36* | (2006.01) |

(52) U.S. Cl.
CPC ......... *B01D 61/3641* (2022.08); *B01D 63/02* (2013.01); *B01D 63/10* (2013.01); *B01D 71/021* (2013.01); *B01D 71/261* (2022.08); *B01D 71/34* (2013.01); *B01D 71/36* (2013.01); *B01D 2311/13* (2013.01); *B01D 2311/2512* (2022.08)

(58) Field of Classification Search
None
See application file for complete search history.

(56) References Cited

U.S. PATENT DOCUMENTS

| | | | |
|---|---|---|---|
| 2016/0031727 A1* | 2/2016 | Yamaguchi | B01D 71/36 210/640 |
| 2019/0118143 A1* | 4/2019 | Mitra | B01D 61/366 |

OTHER PUBLICATIONS

C. Plellis-Tsaltakis, et al., The Use of Fuel Gas as Stripping Medium in Atmospheric Distillation of Crude Oil, Oil Gas Sci. Technol.—Rev. IFP Energies nouvelles, vol. 66 (2011), No. 6, pp. 1017-1024 (Year: 2011).*

* cited by examiner

*Primary Examiner* — Jason M Greene
*Assistant Examiner* — Eric J McCullough
(74) *Attorney, Agent, or Firm* — Rangarajan Souri Rajan; RAJAN LAW OFFICE, LLC (57) ABSTRACT

A membrane distillation (MD) system includes a sweep gas MD (SGMD) module and a knockout chamber. The MD module includes a feed inlet, a feed outlet, a condensing media inlet, and a condensing media outlet. The condensing media is sweep gas. The knockout chamber is positioned after the feed outlet. The knockout chamber includes a liquid inlet, a liquid outlet, and a vapor outlet. Direct gas phase stripping within the SGMD module leads to additional water evaporation at the knockout chamber and contributes to enhanced water or VOCs removal of the MD system.

12 Claims, 6 Drawing Sheets

ONE STEP INTEGRATION OF MEMBRANE DISTILLATION WITH DIRECT AIR-STRIPPING

BACKGROUND OF THE INVENTION

The inventive concepts relate to membrane distillation and particularly, relate to water desalination and/or wastewater concentration systems and methods employing membrane distillation. More particularly, systems and methods for sweep gas membrane distillation with integrated air stripping.

Membrane distillation (MD) is an emerging membrane separation technology that has enormous potential application in numerous fields including, but not limited to, water desalination, ZLD (zero liquid discharge), wastewater treatment in industries (such as power plants, petrochemical, refining, manufacturing, paper making, textile dyes etc.), removal of ions from radioactive wastewater, fruit juice concentration, and membrane crystallization.

In a typical membrane distillation process, feed water at an elevated temperature (40~70° C.) is transported into a MD module, where water vapor is generated and moves to the cold permeate side through pores of a hydrophobic membrane due to the presence of a partial vapor pressure difference and/or temperature difference between the feed side and the permeate side. Because of the hydrophobic nature of the MD membrane, dissolved ions or any other non-volatile components cannot penetrate the membrane and are completely rejected.

Common methods employed to maintain a vapor pressure difference across MD membrane include direct contact MD (DCMD), air gap MD (AGMD), sweep gas MD (SGMD) and vacuum MD (VMD). Pilot scale MD modules using flat-sheet membranes or spiral wound membranes have been demonstrated. Hollow fiber MD module has the advantage of high membrane area to module volume ratio and hence very high compact size. Commercially available hydrophobic hollow fiber membranes were investigated for saltwater desalination in either DCMD or SGMD configuration.

The enhancement of membrane performances by producing innovative membrane architecture is of key importance for MD. A more recent development in MD has been the development of nanocarbon-based membrane for desalination. The nanocarbons such as carbon nanotubes (CNTs), graphene and their various functionalized forms increase the partitioning of water vapor while rejecting hydrogen bonded salt-water phase. This results in significant increase in water vapor flux in comparison to an unmodified membrane.

Although thermal distillation is one of the most common methods for the separation of liquid mixtures, it cannot be used to separate azeotropes where the composition remains unchanged in the vapor and liquid phases. On the other hand, separation in membrane distillation (MD) is driven by a vapor pressure difference across a membrane. Hence, MD can be carried out at a temperature below the boiling point and shows high rejection of dissolved and nonvolatile species. Nanocarbon immobilized membrane (NCIM) may be used for enhanced separation of organic solvents from their aqueous mixtures.

Air stripping is a process in which volatile components of a liquid are transferred to a gaseous medium. For example, the gaseous medium (commonly air) may be injected into groundwater to strip volatile organic compounds (VOCs) from groundwater. It has been used for the treatment of saturated soils and groundwater contaminated by VOCs like petroleum hydrocarbons. In the area of membrane separation, gas/liquid two phase flow method can be utilized to minimize the boundary layer effect in microfiltration, ultrafiltration, membrane bioreactor and other traditional membrane separation processes.

There is a need for systems and methods of MD using gas/liquid two phase flow instead of a single liquid flow for filtration and/or separation. There is also a need for systems and methods for sweep gas membrane distillation with integrated air stripping.

SUMMARY OF THE INVENTION

The inventive concepts overcome the disadvantages of the prior art and fulfill the needs noted above by providing apparatus and methods for sweep gas membrane distillation with integrated air stripping (AS-SGMD). Embodiments of the inventive concepts provide apparatus and methods that may include some or all of the features described below.

The apparatus and methods disclosed herein provide higher water removal rate from the feed. Although the presently disclosed subject matter has particular applications in water desalination or wastewater concentration for zero liquid discharge, the apparatus and methods disclosed herein may also be employed in other applications including but not limited to solvent recovery.

Embodiments of the inventive concepts disclosed herein include novel MD systems which may be used for desalination and wastewater treatment, and methods providing high water recovery from the feed in water desalination or high concentration factor of the feed wastewater in ZLD (Zero Liquid Discharge) application. In desalination application, AS-SGMD will increase the yield of pure water, reduce the temperature and concentration polarization and membrane fouling.

Embodiments of the inventive concepts include MD systems having at least one SGMD module and at least one knockout chamber.

In one or more embodiments of the inventive concepts, an MD module disclosed herein includes a feed inlet operable to receive a feed media and a feed outlet, a condensing media inlet operable to receive condensing media and a condensing media outlet operable to remove a stream of water vapor/gas mixture from the MD module.

In one or more embodiments of the inventive concepts, an AS-SGMD system disclosed herein includes a knockout chamber positioned to receive a stream of water/gas mixture exiting the feed outlet of the SGMD module. The knockout chamber may have at least one liquid outlet connected to the feed reservoir to allow recycling of the feed, to the feed inlet of the next stage of MD system, or to the inlet of a mechanical vapor compression (MVC) equipment.

Further, the knockout chamber may have an opening in its top cover, i.e., a vapor outlet to release air-stripped water vapor to the environment for ZLD application. The knockout chamber may also be connected to a condenser to convert the water vapor into pure water for desalination application and solvent vapor into liquid solvent.

In one embodiment of the inventive concepts, an SGMD module which may be employed in the systems and methods disclosed herein may be selected from a hollow fiber membrane module, a flat membrane module or a spiral wound membrane module. The membrane material may be selected from hydrophobic PTFE (polytetrafluoroethylene), hydrophobic PP (polypropylene), hydrophobic PVDF (polyvinylidene difluoride), hydrophobic PTFE modified with carbon nanomaterials (including but not limited to carbon nanotubes or graphene based materials), hydrophobic PP modified with carbon nanomaterials, hydrophobic PVDF modified with carbon nanomaterials, etc. The system may further include a hot feed inlet, a hot feed outlet, a hot feed channel, a condensing media inlet, a permeate channel, and a condensing media outlet.

In further embodiments of the inventive concepts, methods are disclosed for controlling the effective condensing media flow through the permeate channel. The methods may include using a needle valve and a flow meter or using a mass flow controller, which functions to maintain condensing media flow through the permeate channel at a predetermined value so as to allow certain degree of air stripping in the feed channel and thus enable higher degree of evaporation rate at the knockout chamber.

Other features and advantages of the inventive concepts will become apparent from the following description of the invention, which refers to the accompanying drawings.

DETAILED DESCRIPTION OF THE PREFERRED EMBODIMENTS

Disclosed embodiments relate to an apparatus and methods for sweep gas membrane distillation with integrated air stripping (AS-SGMD).

The terminology used herein is for the purpose of describing particular embodiments only and is not intended to limit the invention. As used herein, the singular terms "a," "an," and "the" are intended to include the plural forms as well, unless the context clearly indicates otherwise.

Figure 1:
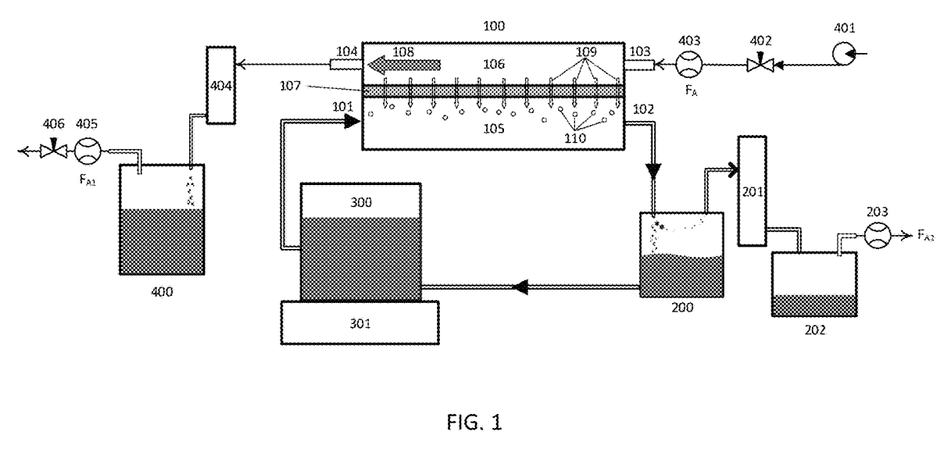
FIG. 1 illustrates a schematic diagram of an AS-SGMD system with one SGMD module coupled to a knockout chamber, wherein concentrated salt water or wastewater is recycled back to a feed reservoir in accordance with an embodiment of the inventive concepts.

Referring now to the drawings, where like elements are designated by like reference numerals, FIG. 1 is an exemplary AS-SGMD system includes one SGMD module (100) coupled to a knockout chamber (200), wherein the concentrated salt water or wastewater is recycled back to the feed reservoir (300). The SGMD module in FIG. 1 may employ membranes such as but not limited to flat membranes, hollow fiber membranes, tubular membranes, spiral wound membranes, etc. The AS-SGMD module (100) includes a feed inlet (101), a feed outlet (102), a condensing media inlet (103), a condensing media outlet (104), a feed channel (105), a permeate channel (106), and a MD membrane (107).

Feed solution in the feed reservoir (300) is heated using a heating unit (301). Conventional heating or microwave heating may be used for heating of the feed solution.

Compared to conventional heating method, microwave heating has several advantages including fast heating, simply controlled heating rate, and more efficient energy conversion. Saline water is significantly more heated than pure water due to rapid heating of salt ions, especially that of large salt ions CF, through field-induced motion by the microwave electric field and energy transfer by the interactions between salt ions and water molecules. Large salt ions that do not fit in the unit cell of the water network make defects to it and cleave the network through oscillations in response to the microwave electric field. The use of microwave heating not only promoted more efficient mass transfer in MD and thus water vapor flux enhancement, but it also consumed much less energy. Performance enhancement in MD with microwave heating can be attributed to non-thermal effects such as the generation of nanobubbles, localized superheating, and breaking down of the hydrogen-bonded salt-water or solvent-water clusters.

The heated feed solution is introduced through the feed inlet (101) into the feed channel (105), where water vapor is generated and moves to the permeate channel (106) through pores of the MD membrane (107). Condensing media, for example, sweep gas, is introduced to the SGMD module (100) via a condensing media inlet (103) at flow rate $F_A$.

Preferably, compressed air is employed as the sweep gas and is supplied by an air pump (401). The air flow rate $F_A$ is regulated using a needle valve (402) and a flow meter (403). A mass flow controller may be employed to replace the needle valve (402) and the flow meter (403). Upon entering the SGMD module (100), a major portion of the sweep air $F_{A1}$ (108) flows through the permeate channel (106) and swipes the MD generated water vapor out of the SGMD module (100) through the condensing media outlet (104) which is connected to a first condenser (404). When the air/vapor mixture passes through the first condenser (404), the vapor is condensed into liquid water and the air/water mixture flows together into a first separation unit (400). The liquid water is stored in the first separation unit (400) and can be used as potable water or process water. The air is released through an opening on the top cover of the first separation unit (404). A flow meter (405) and a needle valve (406) may be connected to the opening so as to regulate flow rate $F_{A1}$ of the air flowing through the permeate channel.

Depending on the feed flow rate (not shown) and the supplied air flow rate $F_A$, a portion of the sweep air (109) flows into the feed channels through the pores of the microporous MD membranes (107). After entering into the feed channel (105), the air is immediately brought into intimate contact with heated water in the feed channel (105) and leads to the formation of micro-sized air bubbles (110) which will eventually be saturated with water vapor due to air-stripping effect. Some of these air bubbles will be able to move together with the feed stream towards the feed outlet (102). The air/water mixture stream exiting the module (100) is routed into the knockout chamber (200) through a stream entrance at the top of the knockout chamber (200), i.e., liquid inlet. When the air/water mixture stream enters the knockout chamber (200), the air bubbles saturated with water vapor immediately separate from the liquid, break and thus release the water vapor inside them. While the air flows out of the knockout chamber (200) through an opening on the top cover, it carries not only the released vapor but also water vapor generated by evaporation of water in the knockout chamber (200). The vapor and air may be discharged directly to the environment.

Alternatively, the air/vapor mixture may be allowed to pass through a second condenser (201), wherein the vapor is condensed into liquid water and then collected in a second separation unit (202) for water reuse. A flow meter (203) may be connected to the air-releasing port of the second separation unit (202) to monitor flow rate $F_{A2}$ of the air entering the feed channel (201).

After releasing the air, the concentrated feed water leaves the knockout chamber (200) through a liquid port at the lower portion of the chamber, i.e., liquid outlet, and is recycled back to the feed reservoir (300). This ensures no air enters into the feed reservoir (300) causing pressure build-up in the fully closed feed reservoir (300).

Figure 2:
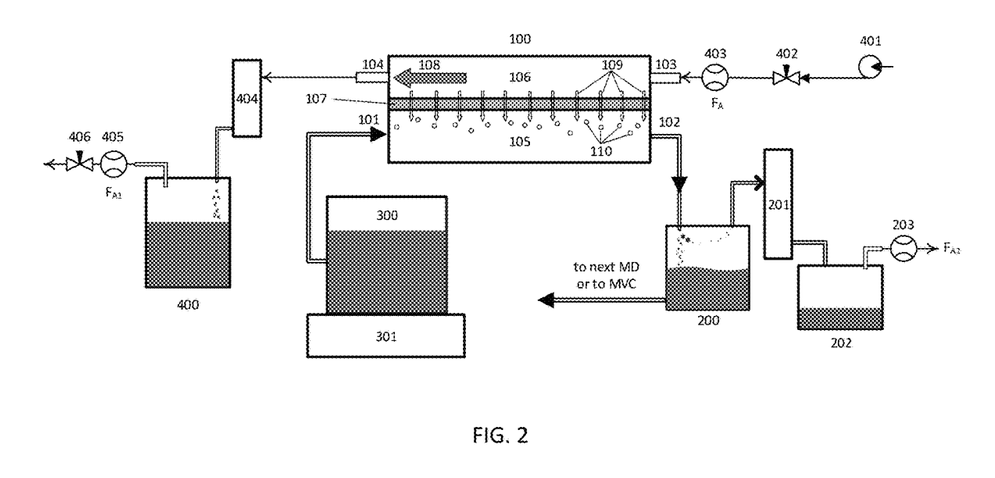
FIG. 2 illustrates a schematic diagram of an AS-SGMD system with one SGMD module coupled to a knockout chamber, wherein concentrated salt water or wastewater is connected to a feed inlet of a next stage of MD system, or to an inlet of a MVC equipment in accordance with an embodiment of the inventive concepts.
Figure 3:
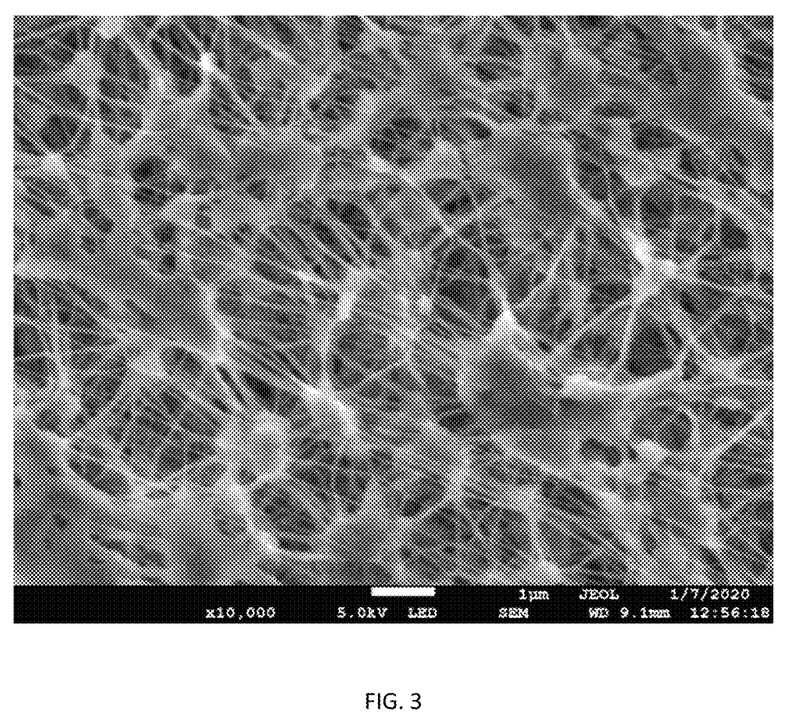
FIG. 3 illustrates a SEM image of hydrophobic surface of pristine PTFE membrane showing porous structure of the pristine PTFE membrane in accordance with an embodiment of the inventive concepts.
Figure 4:
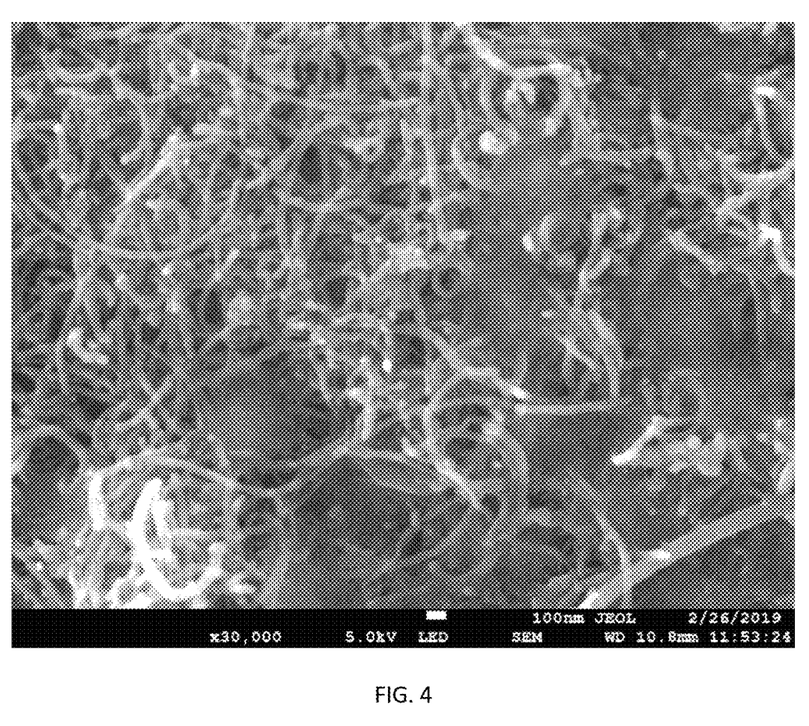
FIG. 4 illustrates an SEM image of the hydrophobic surface modified with immobilized carbon nanotubes showing uniform distribution of CNTs over the entire membrane surface in accordance with an embodiment of the inventive concepts.

Alternatively, the feed water in the knockout chamber (200) may be directed to the next stage of MD processing or to a mechanical vapor compression (MVC) equipment for further concentration, as shown in FIG. 2.

The sweep air entering the feed channel (105) not only can cause air-stripping in the feed channel (105) but can also reduce or even prevent inorganic salt scaling (precipitation fouling) and particulate fouling.

The same system as illustrated in FIG. 1 or its variations may be used for a number of applications including but not limited to water desalination, wastewater concentration, separation of organic solvents from their aqueous mixtures, biofuels and petrochemical waste, etc.

Experiments were conducted using the system in FIG. 1.

Experiment 1

A hollow fiber SGMD module was constructed by placing Accurel PP Q3/2 hydrophobic hollow fiber membranes (about 0.6 mm inner diameter) through a #16 PTFE tubing connected to a compression tee connector at each end. Epoxy was used to seal and secure the hollow fibers at the far end of each tee connector. The effective membrane area of the module is about 37.7 cm².

Figure 5:
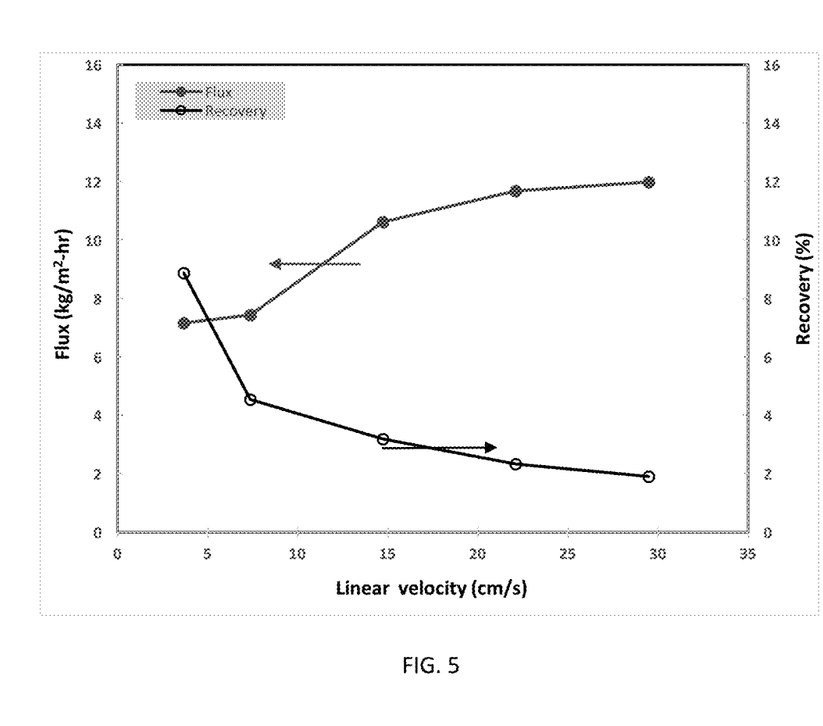
FIG. 5 is a chart illustrating correlation between linear velocity and flux, and linear velocity and recovery in accordance with embodiments of the inventive concepts.

Now referring to FIG. 5 and Table 1, for module configuration with polypropylene hollow fiber membrane, equivalent flux $J_E$ and recovery R as a function of feed flow velocity (v) is shown. For these experiments, the feed water inlet temperature $T_1$ was maintained at about 60° C. and no condenser was used in the testing system. Each test was conducted for about one (1) hour. Initial and final volume of the feed water were measured and their difference (volume reduction) was used for calculation of equivalent flux $J_E$ and recovery R. The latter (i.e., recovery R) is defined as the ratio of volume reduction over the total volume of feed water passed through the MD module.

It can be seen from FIG. 5 and Table 1 that the equivalent flux increases with increasing feed velocity but tends to level off at higher feed velocity. Both equivalent flux and recovery were calculated based on mass reduction of recycled feed water. There are two sources of mass reduction: (1) M1—mass loss of water vapor to the permeate side of hollow fiber membranes, and (2) M2—mass loss of water vapor in the knockout chamber.

TABLE 1

| Feed Water Linear Velocity v (cm/s) | Feed Water Outlet $T_2$ (° C.) | $\Delta T$ (° C.) | Flux $J_E$ (Kg/m² · hr) | Recovery R (%) | Supplied Heat Q (J/min) | Collected Distillate (mL) |
|---|---|---|---|---|---|---|
| 3.7 | 27.91 | 32.50 | 7.15 | 8.99 | 681 | N/A |
| 7.4 | 34.12 | 25.64 | 7.43 | 4.67 | 1074 | 6.8 |
| 14.7 | 46.40 | 12.96 | 10.61 | 3.33 | 1086 | 12.6 |
| 22.1 | 50.96 | 9.01 | 11.67 | 2.44 | 1133 | 13.2 |
| 29.5 | 55.69 | 5.64 | 11.99 | 1.88 | 945 | 12.3 |

Permeate flux depends on both the temperature gradient across the membrane and the rate of heat supplied for water evaporation Q (J/min), which can be calculated as follows:

$$Q = F_1 \times C_p \times \Delta T \quad (1)$$

where $F_1$ is the feed flow rate (g/min), $C_p$ is specific heat of water (4.19 kJ/kg·° C.) and $\Delta T$ (° C.) is the temperature difference between the feed inlet and outlet.

As shown in Table 1, the rate of heat supply Q to the module initially increases with increased feed velocity. For example, 1074 J/min at 7.4 cm/s in comparison to 1133 J/min at 22.1 cm/s. However, further increase of feed velocity beyond certain value leads to decreased Q, for example, 945 J/min at 29.5 cm/s. Note that the change in the quantity of collected water at the permeate side (see Table 1) with feed velocity shows the same trend as that of Q. That is, more water was collected with increasing feed velocity but beyond certain point, the distillate amount was reduced with further increase of feed velocity (for example, 13.2 mL at 22.1 cm/s in comparison to 12.3 mL at 29.5 cm/s). Although no condenser was employed to completely condense water vapor into water, the amount of water collected at the permeate side can be used as a close approximation to the actual mass loss M1 of water vapor. Application of higher feed flow rate resulted in increased driving force for vapor mass transfer across the membrane. This indicates that, as compared to vapor transport across the membrane (dominated by temperature gradient), evaporation of water has more significant effect on MD (dominated by rate of heat supply Q).

Evaporation of water from the knockout chamber depends on water surface temperature, water surface area, air temperature, air humidity and air velocity above the water surface. Assuming that air temperature, air humidity and air velocity were constant, higher feed flow velocity resulted in higher water outlet temperature ($T_2$) and thus higher water surface temperature in the knockout chamber, leading to higher rate of water loss in the knockout chamber (higher $M_2$).

The influence of feed velocity on equivalent flux $J_E$ is a combination of its influence on $M_1$ (mass loss of water vapor to the permeate side of membrane) and $M_2$ (mass loss of water vapor in the knockout chamber). Initially, $J_E$ increased with increasing feed velocity due to increase of both $M_1$ and $M_2$. With further increase in feed velocity (v) beyond 22.1 cm/s, although $M_1$ is reduced due to lower heat supply rate, it was compensated by the higher $M_2$ and the total mass loss still increased but at a slower rate.

As shown in FIG. 5, the recovery R decreases monolithically with increasing feed velocity (v). This is explained by the fact that, at higher feed velocity, the residing time of feed flow in the module is less. Due to limited membrane surface area, the percentage of feed solution in contact with the membrane is therefore less.

Experiment 2

Now referring to Table 2, experiments were conducted regarding the influence of feed velocity (v) on the performance of the same hollow fiber module under DCMD mode and compared to that under AS-SGMD mode. The feed inlet temperature $T_1$ (about 60° C.) was the same as in the case of AS-SGMD tests. Room temperature water (about 15-28° C.) was used as the cooling medium. Similar to the trend under AS-SGMD mode, the flux J increased but the recovery R decreased with increased feed velocity (v).

For application of MD in ZLD (zero liquid discharge) treatment of wastewater, a key process parameter is the concentration factor CF which can be used to indicate the degree at which the solids dissolved in the feed water are concentrated in the brine. It is related to the percentage recovery R by the following equation, $$CF = 1/(1-R) \quad (2)$$

As shown in Table 2, the MD module demonstrated better performance operated under AS-SGMD mode than under DCMD mode, especially at low feed velocity within the tested range. For example, at the highest feed velocity of about 29.5 cm/s, the percent recovery R and concentration factor CF achieved with AS-SGMD are only slightly higher than those achieved with DCMD. At the lowest feed velocity of about 7.4 cm/s, however, both R and CF of SGMD are significantly higher than those of DCMD.

TABLE 2

| Feed Water | SGMD | | | DCMD | | |
|---|---|---|---|---|---|---|
| Linear Velocity (cm/s) | Flux $J_E$ (Kg/m² · hr) | Recovery R (%) | Concentration Factor CF | Flux $J_E$ (Kg/m² · hr) | Recovery R (%) | Concentration Factor CF |
| 7.4 | 7.43 | 4.67 | 104.9% | 3.71 | 2.33 | 102.4% |
| 14.7 | 10.61 | 3.33 | 103.4% | 6.90 | 2.17 | 102.2% |
| 22.1 | 11.67 | 2.44 | 102.5% | 9.02 | 1.89 | 101.9% |
| 29.5 | 11.99 | 1.88 | 101.9% | 11.14 | 1.75 | 101.8% |

Experiment 3

Now referring to Table 3, experiments were conducted regarding the influence of air flow into the feed side. Saline water at about 10,000 ppm salinity in a feed water reservoir was heated and transported to the AS-SGMD module using a peristaltic pump. Feed water flew through the bore side of the hollow fiber membranes. A knockout chamber was connected to the feed outlet to allow escape of additional water vapor from the feed stream before it returned back to the feed reservoir. The feed water inlet temperature was maintained at about 70±0.2° C. Counter-current sweep gas, for example, compressed air at about 20±0.2° C., was introduced into the shell-side, flushed through the space between the PTFE tubing and the hollow fibers, and exited together with water vapor from the module. A condenser was connected to the sweep gas outlet to condense the vapor moisture into cold water. The condensed water and the air were then separated in a separation unit.

TABLE 3

| Test # | $F_A$ (LPM) | $F_{A1}$ (LPM) | $F_{A2}$ (LPM) | $V_1$ (ml) | $V_2$ (ml) | $V_T$ (ml) |
|---|---|---|---|---|---|---|
| 1 | 11.0 | 10.5 | 0.5 | 52.3 | 5.3 | 57.5 |
| 2 | 11.5 | 10.5 | 1.0 | 52.5 | 8.6 | 61.1 |
| 3 | 12.5 | 10.5 | 2.0 | 52.1 | 12.4 | 64.5 |
| 4 | 13.5 | 10.5 | 3.0 | 51.9 | 15.8 | 67.7 |
| 5 | 14.0 | 10.5 | 3.5 | 50.7 | 18.6 | 69.3 |

For all experiments, the effective air flow $F_{A1}$ through the permeate side was kept the same while the total air flow $F_A$ at the sweep air inlet was adjusted to allow varied air flow $F_{A2}$ into the feed side. Each experiment was conducted for about one hour. At the end of each experiment, the volume $V_1$ of condensed permeate water and the total volume reduction $V_T$ of the feed were measured. The difference between $V_T$ and $V_1$ is thus the water loss $V_2$ due to air-stripping.

The knockout chamber positioned between the feed outlet and the feed reservoir allows additional water evaporation represented by $V_2$. With the increase of $F_{A2}$, due to enhanced air-stripping effect, more water was removed from the feed stream leading to higher total volume reduction V. For example, comparing test 1 and test 2, when the gas flow towards the feed side was increased from about 0.5 LPM to 1.0 LPM, the amount of water removed from the feed stream due to air-stripping increased from about 5.3 ml to about 8.6 ml, and the total volume reduction increased from about 57.5 ml to about 61.1 ml.

The AS-SGMD permeate volume $V_1$ remains stable as long as the effective air flow $F_{A1}$ through the permeate channel is kept constant. Although further increase in $F_{A2}$ still enhanced water evaporation at the knockout chamber and led to more water removal, it may slow down vapor transport across the membrane within the AS-SGMD module, as demonstrated by the slight decrease in the permeate volume. It is believed that when too much sweep gas is allowed to flow towards the feed side, the decrease in permeate flux will eventually overweigh the additional water evaporation at the knockout chamber, thus leading to reduced total water removal volume $V_T$.

Experiment 4

Figure 6:
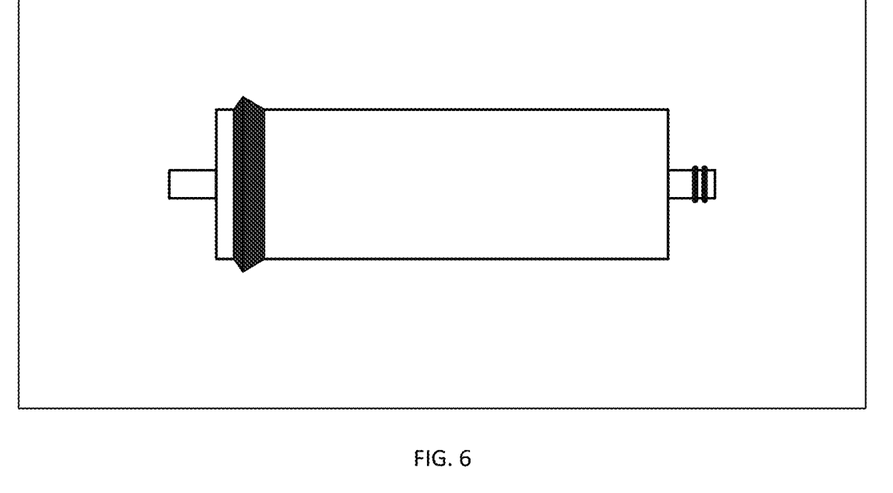
FIG. 6 illustrates a photograph of spiral wound AS-SGMD modules fabricated in accordance with an embodiment of the inventive concepts.

Now referring to FIG. 6, spiral wound AS-SGMD elements are constructed in such a way that the feed enters and leaves the element through a perforated central tube. The hydrophobic sides of two membrane sheets and a feed spacer in between are sealed together to form a membrane envelope. A spiral wound AS-SGMD element is fabricated by rolling up one or more membrane envelopes and one or more sheet of permeate spacers around the central tube. The open permeate channels allow sweep air to remove generated vapor out of the module. A fabricated spiral wound AS-SGMD element is assembled into a membrane housing to form a spiral wound AS-SGMD module.

Now referring to Table 4, two spiral wound AS-SGMD elements were fabricated using pristine PTFE membrane and CNIM membrane, respectively. The two elements have the same effective membrane surface area. The two assembled spiral wound AS-SGMD modules were tested at two different feed flow rates and two different sweep air flow rates using the AS-SGMD system as illustrated in FIG. 1.

TABLE 4

| | Feed Flow Rate | | | | | | | |
|---|---|---|---|---|---|---|---|---|
| | 100 ml/min | | | | 500 ml/min | | | |
| | Air Flow Rate | | | | | | | |
| | 30 LPM | | 15 LPM | | 30 LPM | | 15 LPM | |
| | Recovery | | | | | | | |
| | R (%) | $R_P$ (%) | R (%) | $R_P$ (%) | R (%) | $R_P$ (%) | R (%) | $R_P$ (%) |
| Pristine Membrane | 4.32 | 3.28 | 3.20 | 2.58 | 1.17 | 0.93 | 0.86 | 0.78 |
| CNIM Membrane | 4.57 | 3.55 | 3.46 | 2.78 | 1.45 | 1.21 | 0.95 | 0.84 |

Experimental data of total water recovery R and permeate recovery $R_P$ of the two modules are listed in Table 4. The total water recovery R is the ratio of total volume change of the feed to the volume of feed passed through the module, while the permeate recovery $R_P$ is the ratio of the volume of condensed permeate to the volume of feed passed through the module.

It can be seen that, in all cases, R is always higher than $R_P$. The difference can be attributed to the additional water vapor loss at the knockout chamber induced by air-stripping in the feed stream.

Data in Table 4 also reveal performance enhancement of AS-SGMD module fabricated using CNIM membrane (membrane modified with immobilized carbon nanotubes). Under the same testing conditions, the CNIM-MD module shows higher R and Rp than the module fabricated using unmodified membrane.

Experiment 5

Now referring to Table 5, a spiral wound AS-SGMD element fabricated using CNIM membrane can be used for extraction of organic solvent(s) and hydrocarbons (including gasoline) from its aqueous solution. For example, Isopropanol and ethanol are tested here but this is applicable to all solvents, biofuels and gasoline. All tests were conducted using the same sweep air flow rate and at relatively low feed temperature, preferably about 40±0.5° C. All tests lasted for about 40 minutes.

The separation factor is the measure of the efficiency of separation and is determined from the ratio of the concentration of the more permeable species (i.e., solvent) and the less permeable species (i.e., water) in the permeate divided by the same ratio in the feed side.

After treatment with AS-SGMD, the solvent concentration in the feed decreased and the solvent concentration in the permeate increased. At the end of the test, the solvent concentration in the permeate can be as much as 5.75 times that in the final feed solution and 3.89 that in the initial feed solution. This indicates that AS-SGMD is a viable method to efficiently extract organic solvent from its aqueous mixture.

TABLE 5

| System | Feed Flow (ml/min) | Solvent Concentration in Initial Feed (wt %) | Solvent Concentration in Final Feed (wt %) | Solvent Concentration in Permeate (wt %) | Separation Factor |
|---|---|---|---|---|---|
| isopropanol-water | 200 | 12.02 | 9.18 | 43.0 | 5.52 |

TABLE 5-continued

| System | Feed Flow (ml/min) | Solvent Concentration in Initial Feed (wt %) | Solvent Concentration in Final Feed (wt %) | Solvent Concentration in Permeate (wt %) | Separation Factor |
|---|---|---|---|---|---|
| ethanol-water | 100 | 8.94 | 6.05 | 34.8 | 5.61 |
| ethanol-water | 300 | 8.41 | 5.13 | 24.9 | 3.61 |

While the inventive concepts described herein with reference to illustrative embodiments for particular applications, it should be understood that the inventive concepts are not limited thereto. Those having ordinary skill in the art and access to the teachings provided herein will recognize additional modifications, applications, embodiments and substitution of equivalents all fall within the scope of the inventive concepts. Accordingly, the inventive concepts are not to be considered as limited by the foregoing description.

What is claimed as new and desired to be protected by Letters Patent of the United States is:

1. A sweep gas membrane distillation (SGMD) system with integrated air stripping comprising:
   at least one membrane distillation (MD) module, the at least one MD module comprising at least one membrane, a feed channel, a permeate channel, a sweep gas inlet, a permeate outlet, a feed inlet, and a feed outlet;
   at least one feed reservoir, the at least one feed reservoir being in fluid communication with the feed inlet of corresponding at least one MD module to receive a feed media;
   at least one gas-liquid separator having a first opening, a second opening and a third opening, the at least one gas-liquid separator being in fluid communication with the feed outlet of corresponding at least one MD module via the first opening;
   an air pump to provide a sweep gas as entraining media to remove permeated vapors, the air pump being in fluid communication with the sweep gas inlet via a flow controlling device to control flow and pressure of the sweep gas;

at least one external heating element, the at least one external heating element being positioned to heat the feed media to a first temperature prior to introduction of the feed media to the at least one MD module; and a condenser, the condenser being in fluid communication with the permeate outlet of the corresponding at least one MD module, wherein the at least one gas-liquid separator receives a mixture of a portion of the sweep gas and the feed media exiting the feed outlet via the first opening, the second opening facilitates the feed media to exit the at least one gas-liquid separator, and the third opening facilitates release of portion of the sweep gas from the mixture, wherein the heated feed media is introduced through the feed inlet into the feed channel where vapor generated in the feed channel from the feed media moves to the permeate channel through pores of the at least one membrane, wherein the sweep gas introduced through the sweep gas inlet into the permeate channel helps remove the permeated vapors out of the at least one MD module, wherein the sweep gas in the permeate channel is allowed to partially move into the feed channel to serve as a strip gas leading to formation of micro-sized air bubbles saturated with vapor, wherein the sweep gas and air bubbles saturated with vapor are allowed to move into the gas-liquid separator and are released via the third opening, and wherein the condenser receives the sweep gas and the permeated vapors exiting the permeate outlet and condenses the sweep gas containing the permeated vapors.

2. The SGMD system of claim 1 further comprising more than one MD module.

3. The SGMD system of claim 1, further comprising a second external heating element positioned to heat the feed media exiting the at least one gas-liquid separator to at least a first inlet temperature before entering another MD module.

4. The SGMD system of claim 1, further comprising more than two MD modules and more than two gas-liquid separators arranged serially and plural external heating elements in addition to the at least one external heating element, wherein each of the plural external heating elements is positioned to heat the feed media exiting each of the more than two gas-liquid separators to the first temperature prior to the feed media being introduced to a successive MD module.

5. The SGMD system of claim 1 comprising more than two MD modules and more than two gas-liquid separators, wherein the at least one external heating element is a central heat exchanger positioned to also heat the feed media exiting each of the more than two gas-liquid separators to at least the first inlet temperature prior to the feed media being introduced to a successive MD module.

6. The SGMD system of claim 1 wherein the at least one MD module is independently selected from the group consisting of a hollow fiber membrane module, a tubular module, a flat membrane module and a spiral wound membrane module.

7. The SGMD system of claim 1 wherein the at least one MD module is independently selected from the group consisting of a sweep gas membrane distillation (SGMD) module.

8. The SGMD system of claim 1 wherein the at least one MD module comprises a spiral wound membrane module or a hollow fiber module.

9. The SGMD system of claim 1 wherein the at least one membrane is made of a material from the group consisting of hydrophobic polymer, hydrophobic polytetrafluoroethylene, hydrophobic polypropylene, hydrophobic polyvinylidene difluoride, hydrophobic polytetrafluoroethylene modified with carbon nanomaterials including carbon nanotubes and graphene oxide, hydrophobic polypropylene modified with carbon nanomaterials, and hydrophobic polyvinylidene difluoride modified with carbon nanomaterials.

10. A method for purifying a feed media comprising the steps of:

providing at least one sweep gas membrane distillation (SGMD) module comprising at least one membrane, at least one feed reservoir, an air pump, a vapor condenser, and at least one gas-liquid separator;

heating a feed media to a first temperature using at least one external heating element prior to introduction of the feed media to the at least one SGMD module, the feed media comprising a solvent;

wherein the heated feed media is introduced into a feed channel of the at least one SGMD module where the solvent is vaporized and the vaporized solvent moves to a permeate channel of the at least one SGMD module through pores of the at least one membrane, and wherein the sweep gas introduced into the permeate channel sweeps the vaporized solvent out of the at least one SGMD module, receiving a mixture of a portion of the sweep gas and the feed media exiting the feed channel in the at least one gas-liquid separator, and condensing the sweep gas containing the vaporized solvent exiting each of the at least one SGMD module using the vapor condenser, wherein the heated feed media introduced into a feed channel of the at least one SGMD module where the vaporized solvent generated moves to a permeate channel of the at least one SGMD module through pores of the at least one membrane, and wherein the sweep gas introduced into the permeate channel swipes the vaporized solvent out of the at least one SGMD module.

11. A sweep gas membrane distillation (SGMD) system with integrated air stripping comprising:

a membrane distillation (MD) module comprising at least one membrane, a feed channel, a permeate channel, a sweep gas inlet, a permeate outlet, a feed inlet, and a feed outlet;

an air compressor to provide a sweep gas, the air compressor being in fluid communication with the sweep gas inlet via a needle valve;

at least one external heating element, the at least one external heating element being positioned to heat a feed media to a first inlet temperature prior to introduction of the feed media to the MD module; and a gas-liquid separator having a first opening, a second opening and a third opening, the gas-liquid separator being in fluid communication with the feed outlet of the MD module via the first opening, a condenser, the condenser being in fluid communication with the permeate outlet of the corresponding at least one MD module, wherein the gas-liquid separator receives a mixture of a portion of the sweep gas and the feed media containing a mixture of partial solvent vapor and mainly liquid feed exiting the feed outlet of the MD module, wherein the gas-liquid separator is connected to a feed reservoir containing the feed media to allow recycling of the feed media via the second opening, wherein the at least one external heating element maintains the feed media entering the MD module at the first inlet temperature, wherein a hot feed media is introduced through the feed inlet into the feed channel where the solvent vapor generated moves to the permeate channel through pores of the at least one membrane, wherein the sweep gas introduced through the sweep gas inlet into the permeate channel swipes generated solvent vapor out of the MD module, wherein the sweep gas in the permeate channel is allowed to partially move into the feed channel to serve as a strip gas leading to formation of micro-sized air bubbles saturated with vapor, wherein the sweep gas and air bubbles saturated with vapor are allowed to move into the gas-liquid separator and are released via the third opening, and wherein the condenser receives the sweep gas and the permeated solvent vapors exiting the permeate outlet and condenses the permeated solvent vapors.

12. The SGMD system of claim 1, wherein whole or part of the sweep gas is introduced in a feed side.

* * * * *